(12) United States Patent
Morikawa et al.

(10) Patent No.: US 6,248,384 B1
(45) Date of Patent: Jun. 19, 2001

(54) METHOD FOR FORMING A SPHERICAL DOUGH BODY

(75) Inventors: Michio Morikawa; Eiji Kuribayashi; Toshinori Ohashi, all of Utsunomiya (JP)

(73) Assignee: Rheon Automatic Machinery Co., Ltd. (JP)

( * ) Notice: Subject to any disclaimer, the term of this patent is extended or adjusted under 35 U.S.C. 154(b) by 0 days.

(21) Appl. No.: 09/589,249

(22) Filed: Jun. 7, 2000

Related U.S. Application Data

(62) Division of application No. 09/187,099, filed on Nov. 5, 1998.

(30) Foreign Application Priority Data

Nov. 6, 1997 (JP) .................................................. 9-322301

(51) Int. Cl.[7] ...................................................... A21D 6/00
(52) U.S. Cl. ........................... 426/496; 426/503; 426/512
(58) Field of Search .................................. 426/496, 503, 426/512, 518; 425/329, 332, 364 R, 371

(56) References Cited

U.S. PATENT DOCUMENTS

| | | |
|---|---|---|
| 2,631,549 | 3/1953 | Rhodes . |
| 4,025,273 | 5/1977 | Mauer et al. . |
| 4,124,305 | 11/1978 | Benier . |
| 4,435,144 | 3/1984 | Kemper . |
| 5,270,070 | * 12/1993 | Campbell .............................. 426/503 |
| 5,356,652 | * 10/1994 | Campbell .............................. 426/503 |

FOREIGN PATENT DOCUMENTS

| | | |
|---|---|---|
| 581723C | 8/1933 | (DE) . |
| 651 535 | 10/1937 | (DE) . |
| 1290902B | 3/1969 | (DE) . |
| 2557752B | 6/1977 | (DE) . |
| 2077180A | 12/1981 | (GB) . |
| 3021354A | 12/1981 | (DE) . |
| 55-49664 | 11/1980 | (JP) . |
| 58-33901 | 7/1983 | (JP) . |
| 60-125879 | 8/1986 | (JP) . |
| 09182554 | 7/1997 | (JP) . |
| WO 93/13667 | 7/1993 | (WO) . |

OTHER PUBLICATIONS

EP 98 30 9114 European Search Report.

* cited by examiner

Primary Examiner—George C. Yeung
(74) Attorney, Agent, or Firm—Brinks Hofer Gilson & Lione

(57) ABSTRACT

A method is provided for forming a spherical dough body by rounding a dough piece. The apparatus comprises a pair of opposed pressing and feeding members that apply pressure horizontally to the dough piece and a pressing member that repeatedly applies a force to the lower part of the dough piece, so that the lower part of the dough piece can be brought to the center thereof.

10 Claims, 9 Drawing Sheets

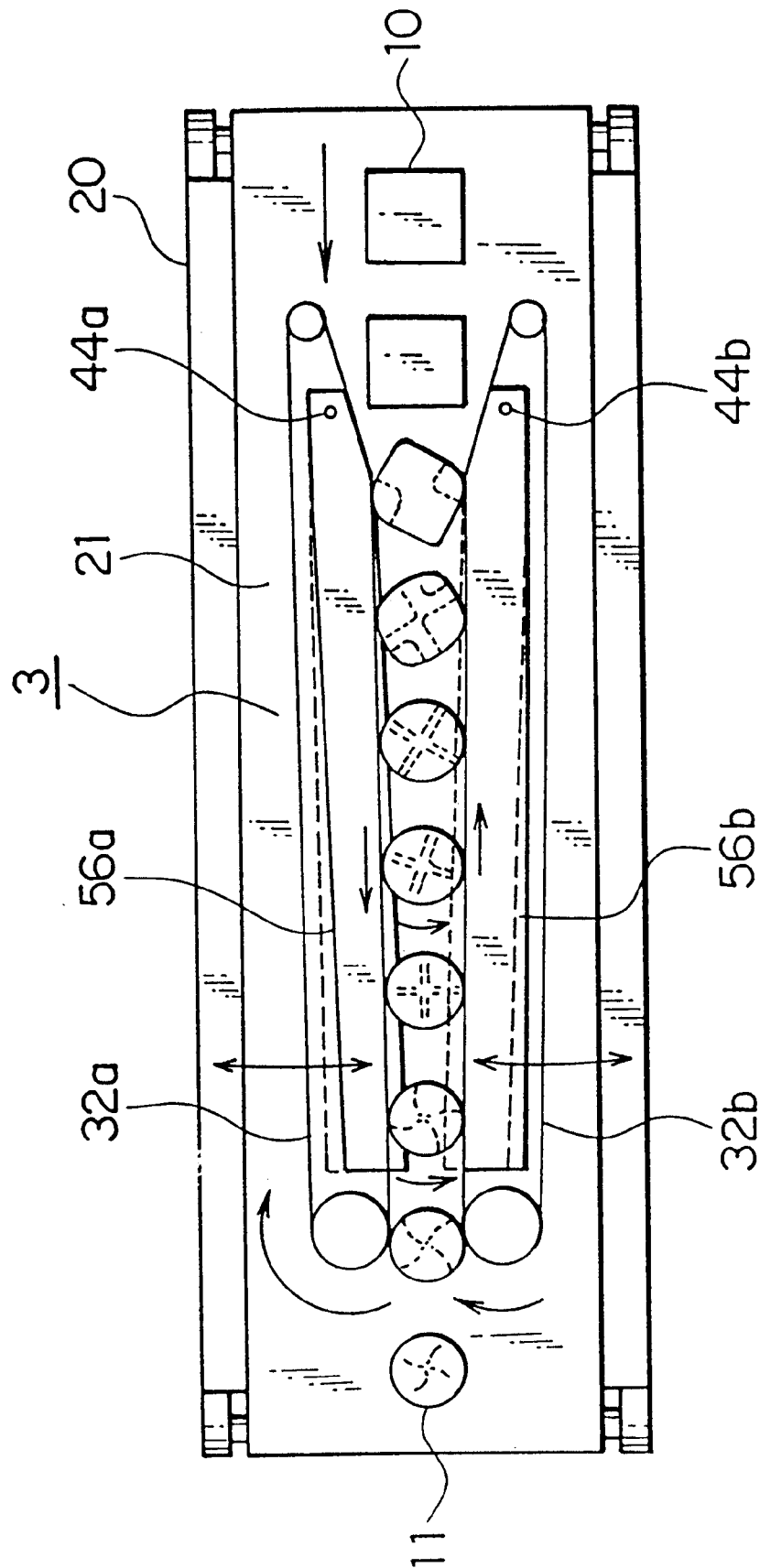

METHOD FOR FORMING A SPHERICAL DOUGH BODY

This application is a division of application Ser. No. 09/187,099, filed Nov. 5, 1998, (pending).

BACKGROUND OF INVENTION

1. Field of Invention

This invention relates to a method and apparatus for rounding a viscous and elastic dough piece such as a bread dough piece to form a substantially spherical dough body while feeding it.

2. Prior Art

In bread production, there is a process of forming a bread dough body by rounding a bread dough piece after cutting a continuous sheet of bread dough with a predetermined thickness into bread dough pieces. By this process, the orientation of the gluten tissue can be improved, the shape of the bread dough piece can be made uniform, and a thin crust can be formed on the surface of the bread dough piece to reduce its viscosity.

In a conventional apparatus, to form a bread dough body, a bread dough piece is pressed and rolled on the slanted surface of a device shaped like a cone (see Japanese Utility Model Laid-open No. 55-4966(4), or a bread dough piece is rounded by a frictional engagement between a conveyor and a slanted plate mounted above the conveyor (see Japanese Utility Model Laid-open No. 58-33901), or a bread dough piece is rounded l)v swinging a pair of plates (see Japanese Utility Model Publication No. 60-125879).

As stated above, various devices are used in prior-art apparatuses. However, they cannot sufficiently round a bread dough piece. Also, in the prior-art apparatuses a bread dough piece needs to be moved for a long distance to be rounded. Thus, they cannot be made smaller. Thus, also, the inner tissue of the bread dough piece is damaged.

SUMMARY OF INVENTION

To overcome the disadvantages of the prior-art apparatuses, this invention is provided.

One object of this invention is to provide a method of forming a spherical dough body comprising feeding a dough piece in one direction, applying pressure horizontally to the dough piece to squeeze it, rotating the dough piece around substantially the vertical axis thereof, and repeatedly applying a force to the lower part of the dough piece in at least one direction that is almost at right angles with the feeding direction of the dough piece so as to bring a part of the lower part of the dough piece to the center thereof.

Another object of this invention is to provide a method of forming spherical dough bodies comprising feeding dough pieces in one direction, applying pressure horizontally to the dough pieces to squeeze them, rotating the dough pieces substantially around their vertical axes, and repeatedly applying force to the lower part of the dough pieces in at least one direction that is almost at right angles with the feeding direction of the dough pieces so as to bring a part of the lower part of each of the dough pieces to the center thereof.

Another object of this invention is to provide a method of forming a spherical dough body comprising feeding a dough piece in one direction, applying pressure horizontally to the dough piece to squeeze it, rotating the dough piece around substantially the vertical axis thereof, repeatedly applying a force to the lower part of the dough piece in at least one direction that is almost at right angles to the feeding direction of the dough piece so as to bring a part of the lower part of the dough piece to the center thereof, and repeatedly applying a pressure on the higher part of the dough piece from above it while applying pressure horizontally to the dough piece.

Another object of this invention is to provide a method of forming spherical dough bodies comprising cutting a sheet of dough that has a predetermined thickness and that is being fed on a conveyor into dough pieces, feeding each dough piece to one of a plurality of pressing and feeding means, each of which has a pair of opposed pressing and feeding members disposed above a support member, while the dough pieces are spaced apart from each other both in the width direction and in the feeding direction of the conveyor, applying pressure horizontally to the dough pieces to squeeze them, rotating the dough pieces around substantially the vertical axes thereof, repeatedly applying a force to the lower part of the dough pieces in at least one direction that, is almost. at right angles with the feeding direction of the dough pieces so as to bring a part of the lower part of the dough pieces to the center thereof, and repeatedly applying a pressure to the higher part of the dough pieces from above them while applying pressure horizontally to the dough pieces.

Another object of this invention is to provide an apparatus for forming a spherical dough body comprising a support member on which a dough piece is placed, pressing and feeding means having a pair of opposed pressing and feeding members disposed above the support member, a means for applying a force to the lower part of the dough piece in a direction that is substantially at right angles to the feeding direction of the dough piece, while pressure is applied to the dough piece by the pair of pressing and feeding members, so as to squeeze the dough piece, and actuating means for reciprocating the means for applying a force to the lower part of the dough piece.

Another object of this invention is to provide an apparatus for forming spherical dough bodies comprising a support member on which dough pieces are placed, a plurality of pressing and feeding means disposed parallel to each other, each pressing and feeding means having a pair of opposed pressing and feeding members disposed above the support member, means for applying a force to the lower part of the dough pieces in the direction that is substantially at right angles to the feeding direction of the dough pieces, while pressure is applied to the dough pieces by the pair of pressing and feeding members, so as to squeeze the dough pieces, and actuating means for reciprocating the means for applying a force to the lower part of the dough pieces.

Another object of this invention is to provide an apparatus for forming a spherical dough body comprising a support member on which a dough piece is placed, pressing and feeding means having a pair of opposed pressing and feeding members disposed above the support member, a means for applying a force to the lower part of the dough piece in a direction that is substantially at right angles to the feeding direction of the dough piece, while pressure is applied to the dough piece by the pair of pressing and feeding members, so as to squeeze the dough piece, actuating means for reciprocating the means for applying a force to the lower part of the dough piece, a pressing means having at least one pressing member for applying a pressure to the higher part of the dough piece from above it, the pressing member being disposed above the gap between the two opposed pressing and feeding members, and actuating means for reciprocating the pressing member.

The effectiveness of this invention in forming a spherical dough body is high, so that the dough piece can be rounded without being fed for a long distance. Thus, the apparatus can be made smaller. Also, the inner tissue of the dough is prevented from being damaged while it is rounded. Therefore, the disadvantages of the prior-art apparatuses have been overcome.

BRIEF DESCRIPTION OF THE DRAWINGS

FIG. 10 is a schematic plan view that illustrates the fifth embodiment of this invention.

EXPLANATION OF THE PREFERRED EMBODIMENT

The first embodiment of this invention will now be explained by reference to FIGS. 1 to 4.

Each square-shaped bread dough piece 10 is prepared by cutting a sheet of bread dough with a predetermined thickness by means of a conventional cutting means (not shown). The bread dough pieces 10 are fed separately, while they are spaced apart from each other in the feeding direction, by a conveyor 20.

Figure 1:
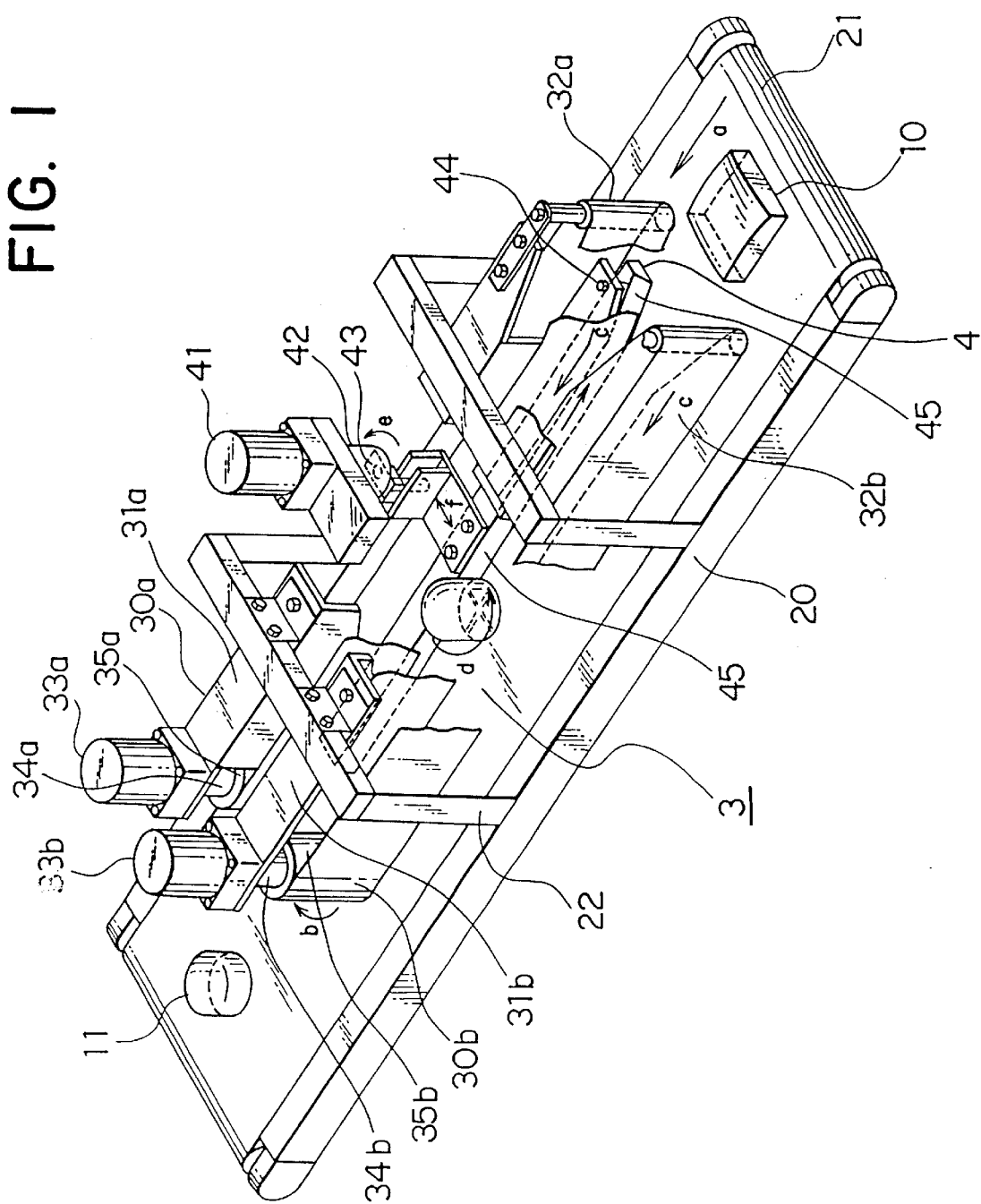
FIG. 1 is a perspective view that illustrates the first embodiment of this invention.

The conveyor 20 includes a conveyor belt 21, on which the square-shaped bread dough piece 10 is fed in a direction indicated by an arrow (a) in FIG. 1. The conveyor belt 21 is driven by means of a motor (not shown).

A pressing and feeding means 3 is mounted on the conveyor 20. It comprises a pair of pressing and feeding conveyors 30a and 30b. Both are fixed to a frame 22. They are oppositely mounted on the conveyor 20 along its feeding direction, so that the bread dough piece 10 can be passed through the gap between them. This gap can be adjusted according to the shape or the size of the bread dough piece 10 to be passed through them.

The pressing and feeding conveyors 30a and 30b ale provided with frames 31a and 31b, on which motors 33a and 33b are mounted, respectively. The motors 33a and 33b drive conveyor belts 32a and 32b, respectively. In operation, when the motors 33a and 33b are energized, pulleys 35a and 35b are rotated in the directions indicated by an arrow (b) in FIG. 1, by means of bearing cases 34a and 34b, so that the conveyor belts 32a and 32b are moved in the directions indicated by arrows (c) in FIG. 1, respectively.

Figure 2:
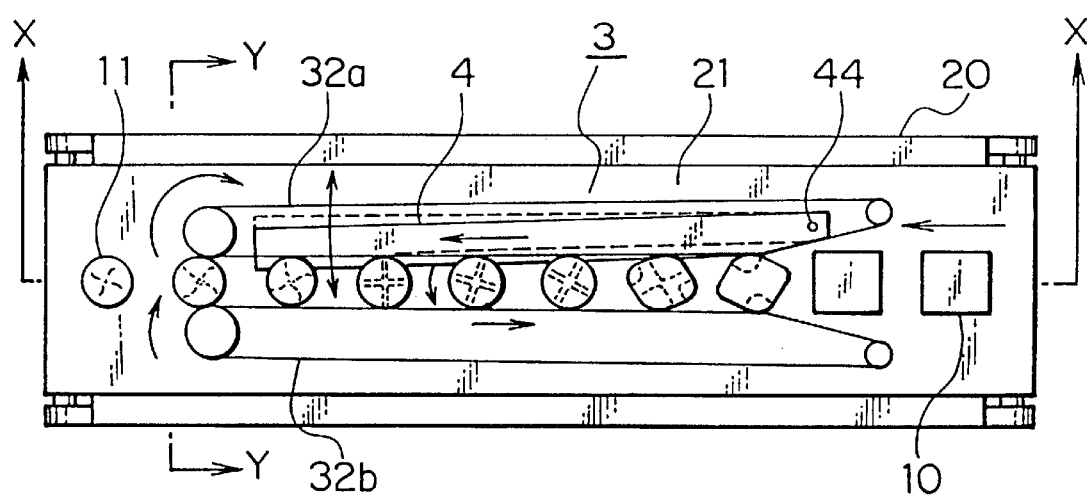
FIG. 2 is a schematic plan view that also illustrates the first embodiment of this invention.
Figure 3:
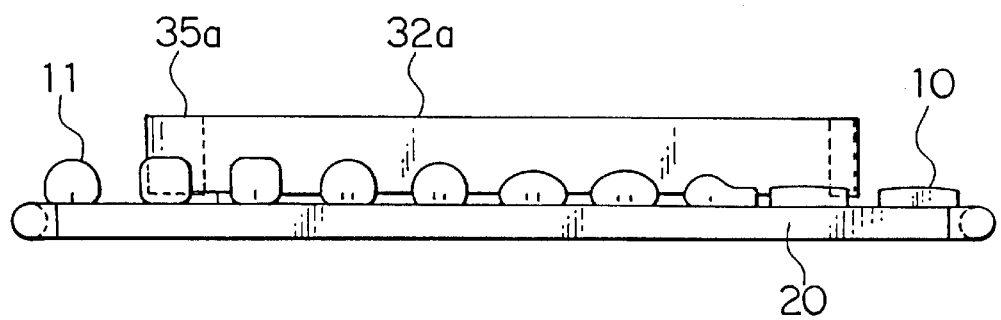
FIG. 3 is a schematic side view taken on lines X—X of FIG. 2.
Figures 4A, 4B:
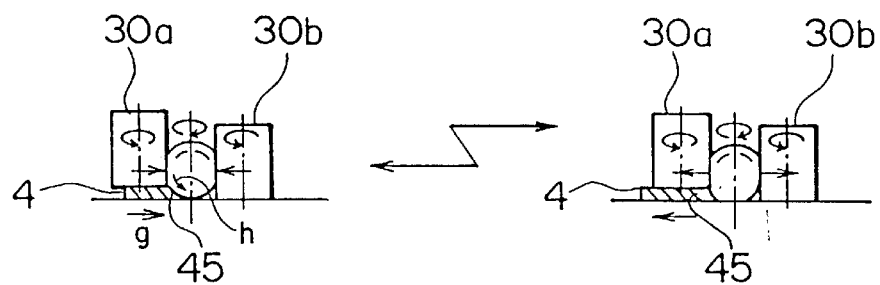
FIGS. 4(A) and 4(B) are elevational views, partly in cross section, taken on lines Y—Y of FIG. 2.

The conveyor belts 32a and 32b are moved in different directions such that, as in FIG. 2, the conveyor belt 32a that engages the bread dough piece 10 is moved in the feeding direction of the conveyor 20, while the conveyor belt 32b, which also engages the bread dough 10, is moved in the direction opposite to the feeding direction of the conveyor 20. The conveyor belt 32a is moved faster than the conveyor belt 32b, so that the bread dough piece 10 can be fed in the feeding direction of the conveyor 20.

Thus, the bread dough piece 10 passes through the gap between the conveyor belts 32a and 32b, and simultaneously the bread dough piece 10 is subjected to a rotational force from the conveyor belts 32a and 32b. Therefore, the dough piece 10 is rotated about the substantially vertical axis thereof in the direction indicated by an arrow (d) in FIG. 1. As a result, as in FIG. 3, the square-shaped bread dough piece 10 is gradually rounded while being fed by the conveyor 20, and finally it is shaped into a substantially spherical dough body 11.

A swing plate 4 is attached to the pressing and feeding conveyor 30a. A side surface of the pressing and feeding conveyer 30a contacts the bread dough piece 10, and moves in the feeding direction of the conveyor 20. It has a supporting point 44, which is positioned at the end of the frame 31a. Above the frame 31a a motor 41 is mounted. A crank 43, which is attached to the bottom of a bearing case 42, is connected to the swing plate 4. In operation, when the motor 41 is energized, the crank 43 is rotated in the direction indicated by an arrow (e) in FIG. 1 through the bearing case 42, so that the swing plate 4 is reciprocated in the directions indicated by an arrow (f) in FIG. 1. As a result, the swing plate 4 repeatedly swings about the supporting point 44.

Therefore, while the bread dough piece 10 passes through the gap between the pressing and feeding conveyors 30a and 30b, the swing plate 4 repeatedly applies a force to a part of the lower part of the bread dough piece 10, so that a part of its lower part is brought to the center thereof.

The swing plate 4 has a slanted face 45 that effectively applies a force to the bread dough piece 10 so that a part of its lower part is smoothly brought to the center thereof. In detail, FIGS. 4(A) and (B) show the bread dough piece 10 being rounded is it is fed through the gap between the pressing and feeding conveyors 30a and 30b. As in FIG. 4 (A), the slanted face 45 of the swing plate 4 applies a force to a part of the lower part of the bread dough piece 10 in the direction indicated by an arrow (g), so that a part of the lower part of the bread dough is moved in the direction indicated by an arrow (h). Then, as in FIG. 4(B), the swing plate 4 is moved apart from the bread dough piece 10. Then, the lower part of the bread dough piece 10 drops to the conveyor. The swing plate 4 is reciprocated so that it repeatedly applies a force to the lower part of the bread dough piece 10. As a result, that part is brought to the center thereof.

In this embodiment the bread dough piece 10 is square-shaped. However, a small round-shaped dough piece can also be produced.

In this embodiment the conveyor 20 is used for feeding the bread dough piece 10 in one direction. However, alternatively, another support member and that is stable, such as a table, can be used. In this case, the bread dough piece 10 can be fed in one direction by means of the movement of the opposed conveyor belts 32a and 32b.

In this embodiment the pressing and feeding conveyors 30a and 30b are mounted flatly on the conveyor 20. However, alternatively, the pressing conveyors 30a and 30b arm be slanted toward each other according to the size and shape of the bread dough 10 to be passed through them.

In this embodiment the swing plate 4 has the slanted surface 45 along its entire length. However, alternatively, the swing plate 4 lay have the slanted face 45 along just a part of its surface. Also, in this embodiment the slanted face 45 slants downward. However, alternatively, it can slant upward. The angle of the slant can be adjusted according to the size or shape of the bread dough piece 10.

Figure 5:
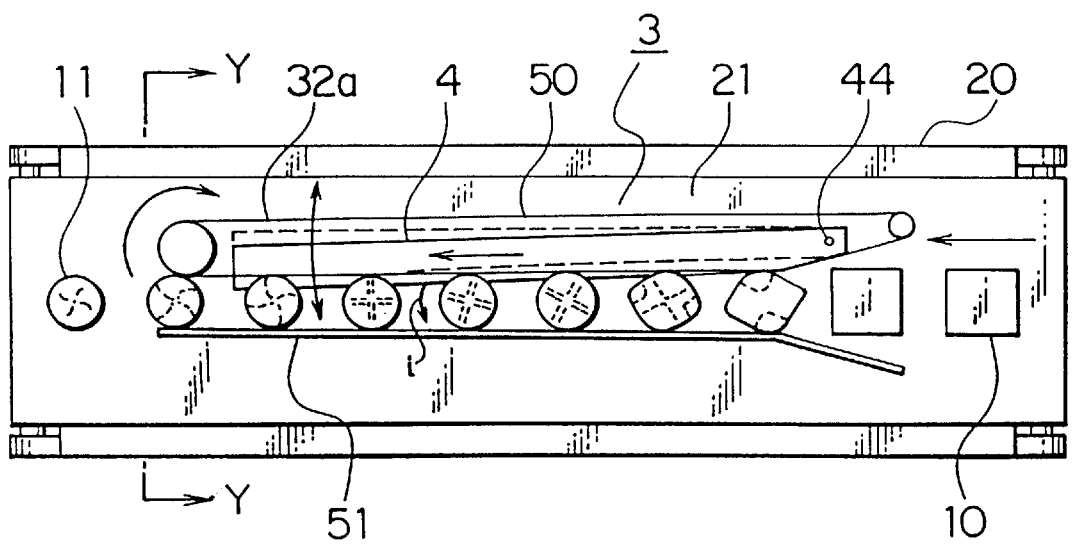
FIG. 5 is a schematic plan view that illustrates the second embodiment of this invention.
Figure 6A:
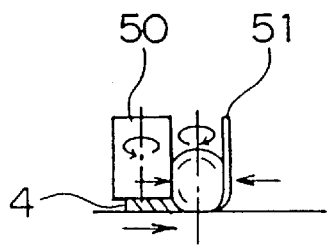
FIGS. 6(A) and (B) are elevational views, partly in cross section, taken on lines Y—Y of FIG. 5.
Figure 6B:
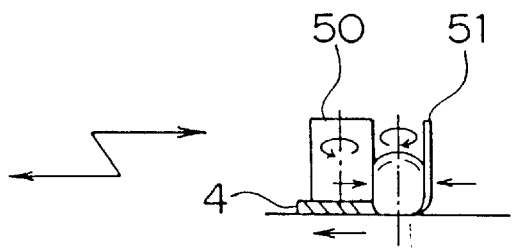

The second embodiment of this invention will now be explained by reference to FIGS. 5, 6(A), and 6(B).

In this embodiment one of the pressing and feeding members is composed of a plate 51, while the other is composed of a conveyor 50. The face of the conveyor 50 facing the plate 51 is moved in the feeding direction of the conveyor 20. Thus, the bread dough piece 10 is rotated about the substantially vertical axis thereof in the direction indicated by an arrow (i) in FIG. 5.

The swing plate 4 is placed at the lower part of the conveyor 50. As in FIGS. 6(A) and 6(B), the swinging and reciprocating movements of the swing plate 4 are the same as those of the first embodiment.

Figure 7:
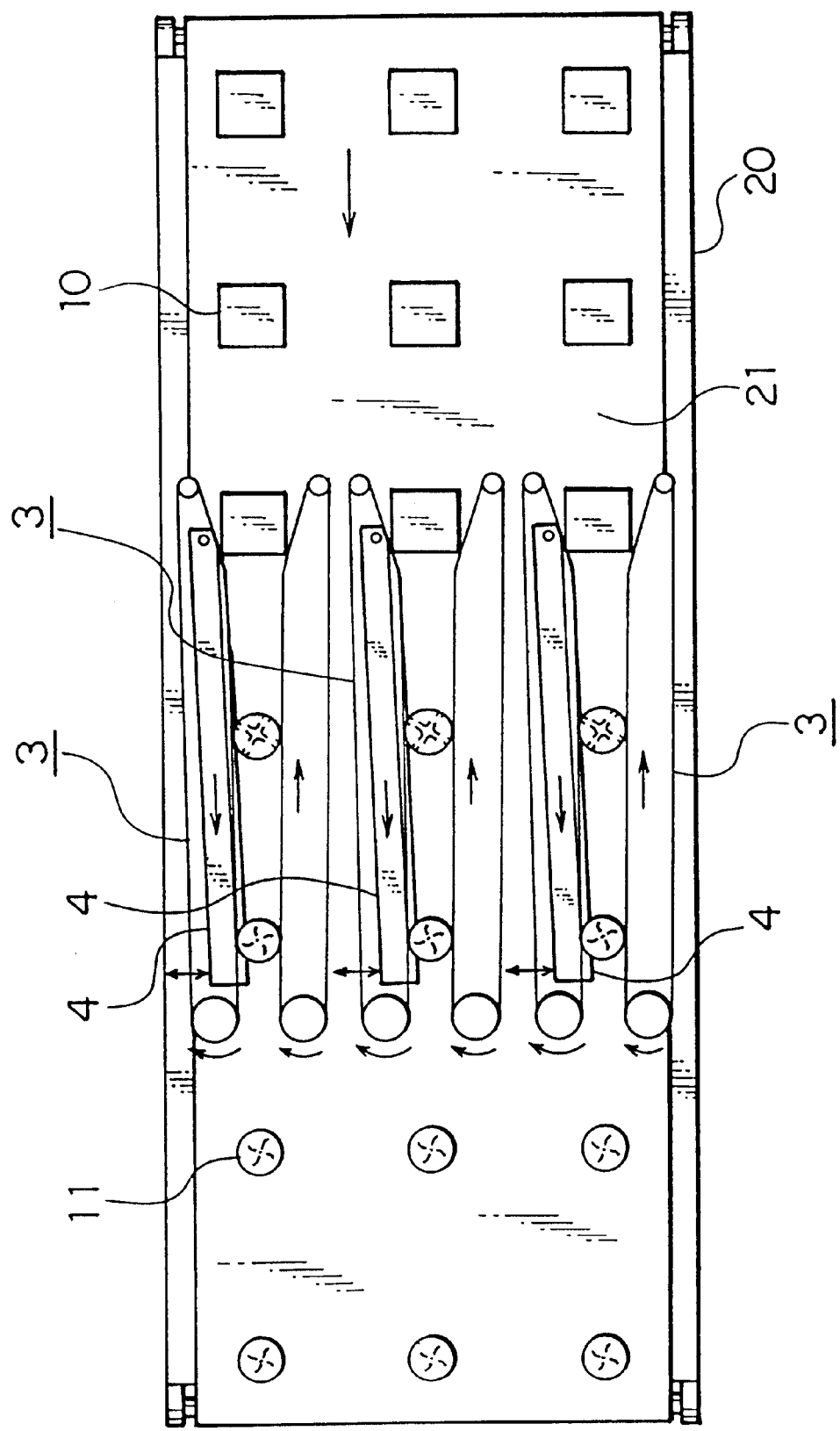
FIG. 7 is a schematic plan view that illustrates the third embodiment of this invention.

The third embodiment of this invention will now be explained by reference to Fig. 7.

In this embodiment, as an initial stage, the dough pieces 10 are cut from a sheet of dough that has a predetermined thickness and that is being fed on the conveyor 20. The dough pieces 10 are fed in three lines separately, while they are spaced apart from each other both in the width direction and in the feeding direction, by the conveyor 20. Three pressing and feeding means 3 are arrayed parallel to, each other above the conveyor 20. Each of the dough pieces 10 is fed to one pressing and feeding means 3. Therefore, many of the bread dough pieces 10 that are fed by the conveyor 20 can be rounded and shaped into spherical dough bodies 11. Therefore, mass production can be efficiently attained.

Figure 8:
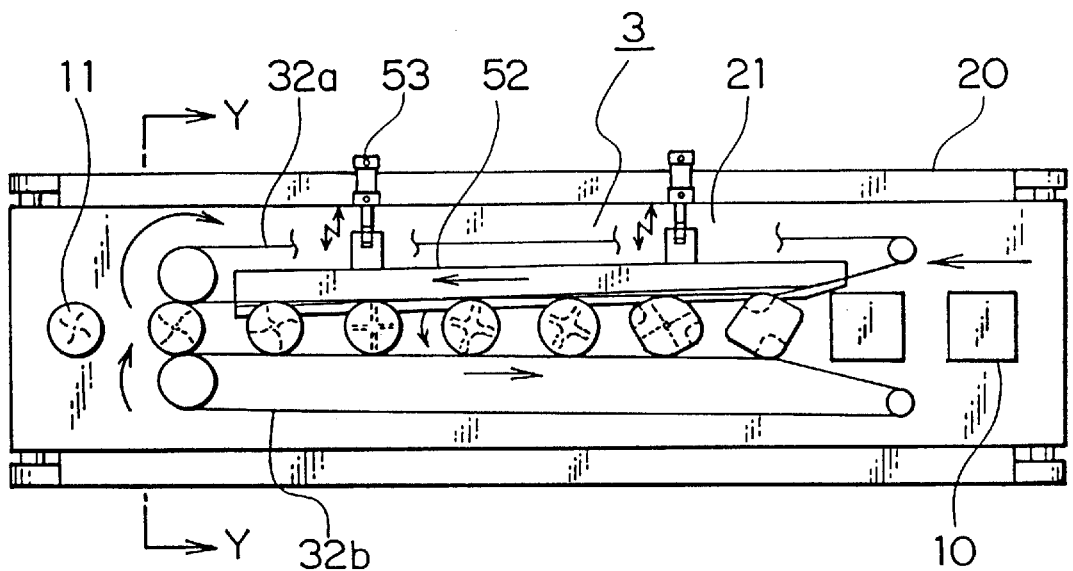
FIG. 8 is a schematic plan view that illustrates the fourth embodiment of this invention.

The fourth embodiment of this invention will now be explained by reference to FIGS. 8, 9(A), and 9(B).

In this embodiment a swing plate 52 is repeatedly swung by drive means such as an air cylinder 53. Alternatively, other drive means can be used.

Figure 9A:
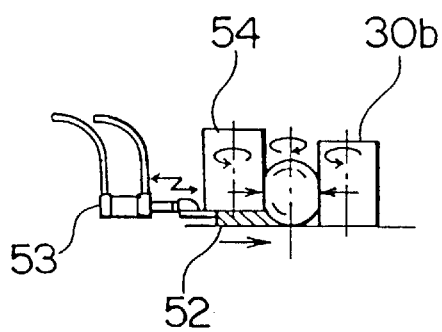
FIGS. 9(A) and (B) are elevational views, partly in cross section, taken on lines Y—Y of FIG. 8.
Figure 9B:
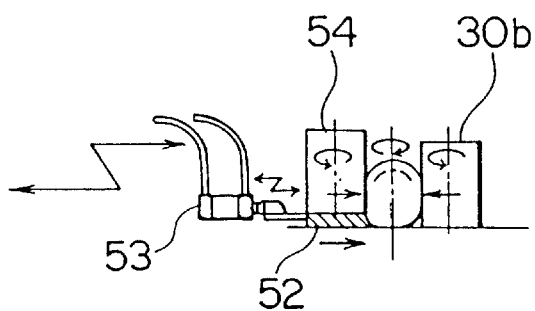

In this case, as in FIG. 9(A), the swing plate 52 is adapted to extend beyond the lower face of a pressing and feeding conveyor 54 toward the bread dough piece 10. As in FIGS. 9(A) and 9(B), the swinging and reciprocating movements of the swing plate 52 are the same as those of the swing plate 4 in the first embodiment. Therefore, a part of the lower part of the bread dough piece 10 is brought to the center thereof.

In this embodiment, the plate 54 is adapted so that the distance that the swing plate 52 presses at the downstream part of the conveyor 20 is greater than that of the swing plate 52 at the upstream part thereof. However, alternatively, these two forces can be adjusted to be the same.

The fifth embodiment of this invention will now be explained by reference to FIG. 10.

In this embodiment, at both sides of the lower part of the pair of the conveyor belts 32a and 32b, swing plates 56a and 56b are disposed, respectively. They are activated to swing by drive means (not shown). The swinging and reciprocating movements of the swing plates 56a and 56b are the same as those of the swing plate 4 in the first embodiment. Thus, while pressure is applied to the higher part of the bread dough piece 10 by means of the pressing and feeding conveyors, pressure is applied to its lower part from both sides by means of the swing plates 56a and 56b.

Therefore, the effectiveness of this embodiment in bringing a part of the lower part of the bread dough piece 10 to the center thereof is higher than that of the first embodiment. Thus, the bread dough piece 10 is more speedily rounded and shaped into a spherical dough body 11 with a shorter traveling distance. As a result, the pressing and feeding conveyors can be shortened.

Therefore, the problem in the prior-art apparatuses wherein they could not be made smaller due to their low effectiveness in rounding the bread dough piece has been overcome.

Figure 11:
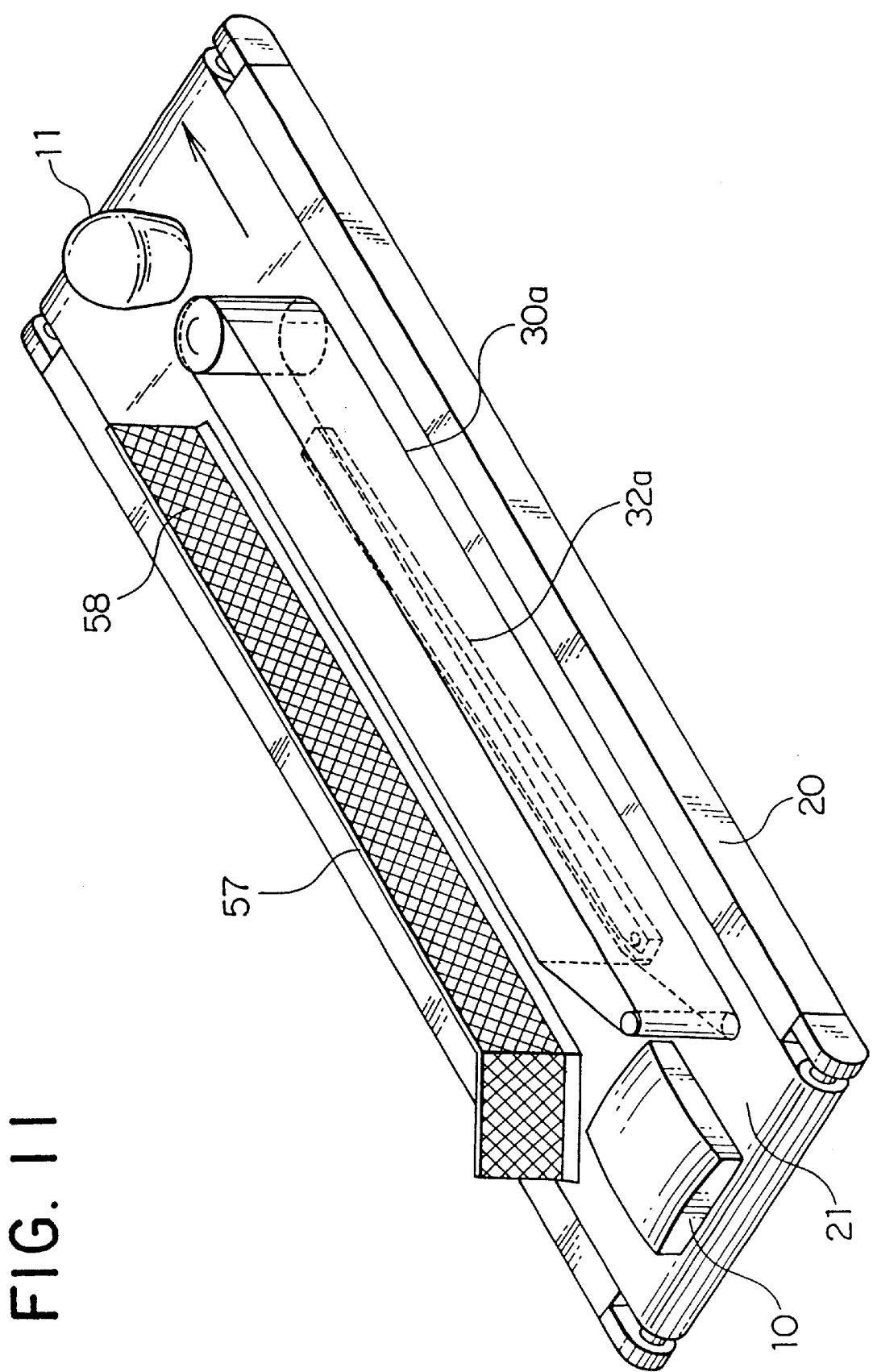
FIG. 11 is a schematic and perspective view that illustrates the sixth embodiment of the invention.

The sixth embodiment of this invention will now be explained by reference to FIG. 11.

This embodiment is almost the same as the second embodiment, wherein one of the pressing and feeding members is composed of a plate 57, except that a non-adhesive belt 58 is affixed to the surface of the plate 57 facing the bread dough piece 10, so as to avoid the bread dough piece 10 from adhering to the plate 57. Therefore, the bread dough piece 10 can be rounded and shaped into a spherical body 11 without adhering to the plate 57.

In this embodiment, the non-adhesive belt 58 is used. However, alternatively, another non-adhesive material can be used.

Figure 12:
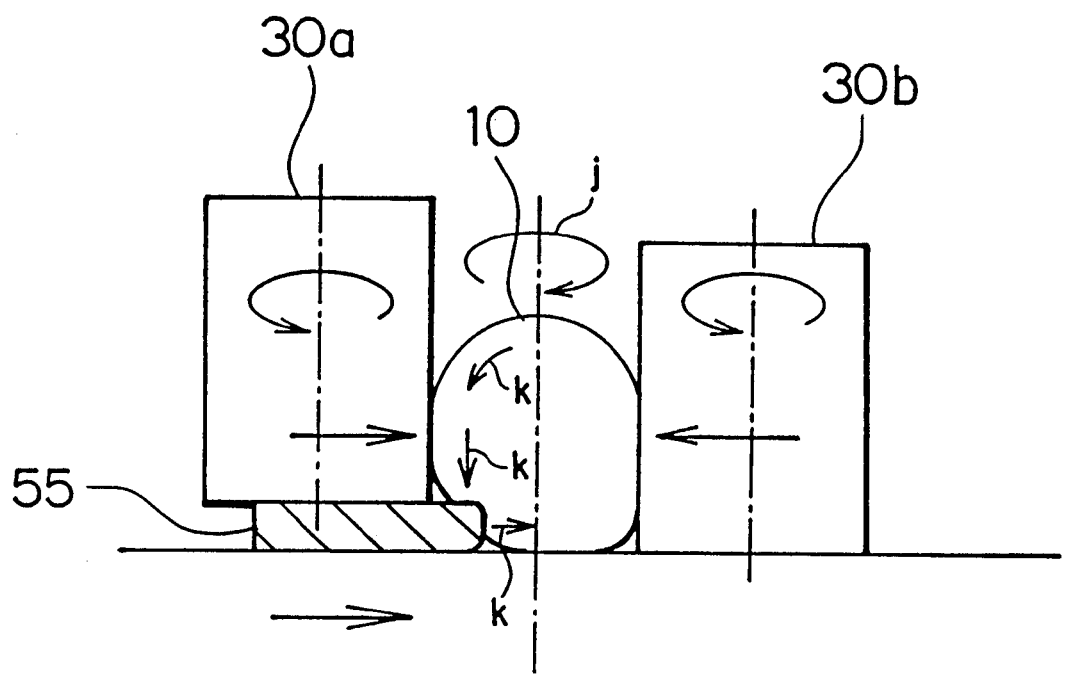
FIG. 12 is a schematic and elevational view, partly in cross section, that illustrates the seventh embodiment of this invention.

The seventh embodiment of this invention will now be explained by reference to FIG. 12.

In this embodiment, the surface of a swing plate 55 that applies a force to the bread dough piece 10 does not slant. Instead, it is roundly chamfered. Thus, this embodiment has an effect to apply a strong force to the lower part of the bread dough piece 10 so as to forcibly press a part of it against the center thereof. Simultaneously, as shown by an arrow (j), the periphery of the bread dough piece 10 is rotated by means of the pressing and feeding conveyors 30a and 30b. Thus, a part of the bread dough is moved in the directions indicated by arrows (k). Also, the swing plate 55 repeatedly applies a force to the lower part of the bread dough piece 10. Thus, its lower part is brought to the center thereof.

Therefore, the effectiveness of this embodiment in rounding a hard bread dough piece is better than that of the first embodiment, wherein the swing plate 4 has the slanted surface 45.

Figure 13:
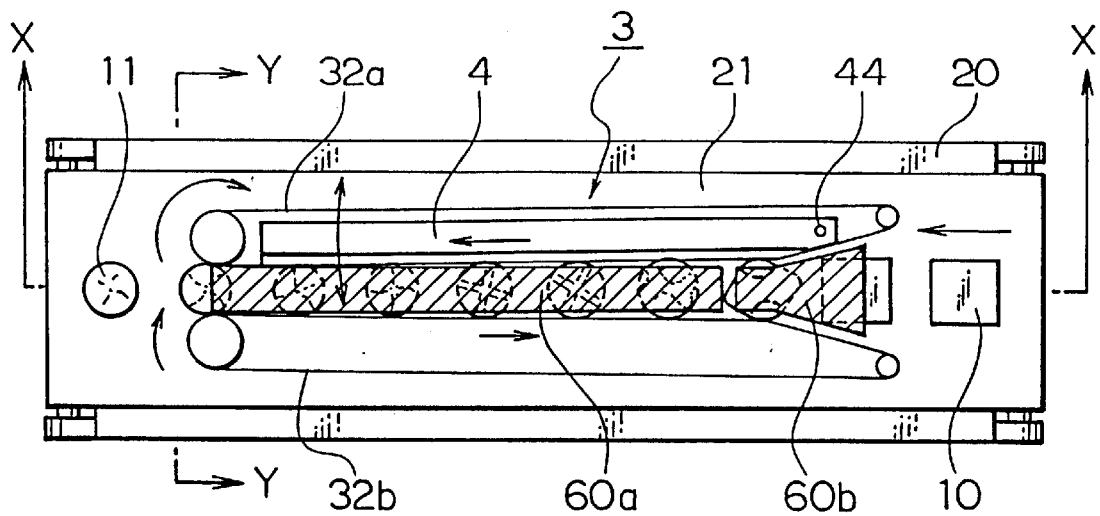
FIG. 13 is a schematic plan view that illustrates the eighth embodiment of this invention.

The eighth embodiment of this invention will now be explained by reference to FIGS. 13, 14, and 15.

In this embodiment, two pressing members 60a and 60b are disposed above the gap between the pressing and feeding conveyors 30a and 30b. They are reciprocally moved up and down by drive means (not shown). As an example, arms to support the pressing members 60a and 60b and motors to drive them by means of a crank mechanism can be used. In operation, when the motor is energized, the pressing members 60a and 60b are reciprocally moved up and down by means of the crank (not shown). As in FIGS. 15(A) and 15(B), the pressing member 60a repeatedly increases and decreases the distance from the conveyor.

In the above-mentioned embodiments, while pressure is applied horizontally to the bread dough piece 10 by the pressing and feeding conveyors 30a and 30b, pressure is applied to the lower part of the bread dough piece 10 by the swing plate 4. However when force is applied to the lower part of the bread dough piece 10 by the swing plate 4, the bread dough piece 10 springs upward according to its size, shape, or viscosity. As a result, the bread dough piece 10 cannot be rounded effectively. To resolve this problem, as in FIG. 15(B), the pressing element 60a applies a force on the higher part of the bread dough piece 10 from above the gap between the two pressing and feeding conveyors 30a and 30b.

Figure 14:
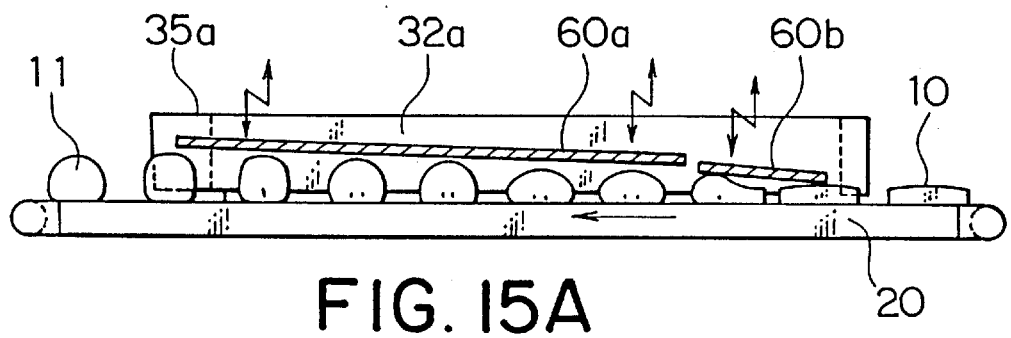
FIG. 14 is a schematic side view taken on lines X—X of FIG. 13.
Figure 15A:
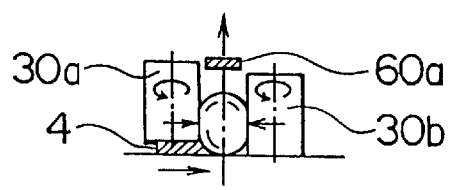
FIGS. 15(A) and (B) are schematic and elevational views, partly in cross section, taken on lines Y—Y of FIG. 13.
Figure 15B:
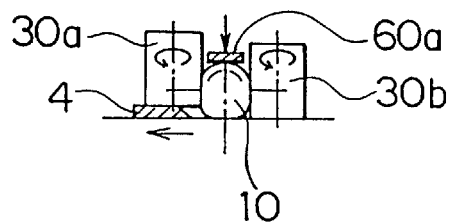

As in FIG. 14, while the bread dough piece 10 is fed by the conveyor 20 in one direction, it is rounded, and thus, its height increases. The proportion of the increase differs according to the nature of the bread dough piece 10. Thus, to apply a force steadily to the bread dough piece 10 at any height by pressing means, the pressing means is divided into two pressing members 60a and 60b, and each pressing member is slanted according to the height of the bread dough piece 10.

In this embodiment, the pressing means comprises two pressing members 60a and 60b. However, the number of pressing members can be optionally selected according to the nature of the bread dough piece 10. Also, the angle of the pressing members 60a and 60b and the distance from the conveyor 20 can be optionally selected according to the nature of the bread dough piece 10.

In this embodiment, flat plates are used for the pressing members 60a and 60b. However, alternatively, curved plates can be used according to the nature of the bread dough piece 10.

By this invention, a part of the lower part of the bread dough piece is brought to the center thereof. Thus, a firm crust can be formed on the surface of the bread dough, and the dough piece can be rounded sufficiently and shaped into a spherical dough body. Also, by this invention, a sheet of dough having a varying thickness is cut to provide many dough pieces, and they are processed by the pair of opposed pressing and feeding members. Therefore, a systematized line to mass produce spherical dough bodies can be constructed.

Also, the effectiveness of this invention in forming a spherical dough body is high, so that a dough piece call be rounded without being fed for a long distance. Thus, the apparatus can be made smaller. Also the inner tissue of the dough is prevented from being damaged while it is rounded.

What is claimed is:

1. A method of forming a spherical dough body, comprising:

feeding a dough piece in a feeding direction;

applying pressure horizontally on both sides of the dough piece at the same time to squeeze the dough piece;

rotating the dough piece substantially around a vertical axis of the dough piece; and repeatedly applying a force to a lower part of the dough piece in a direction that is substantially perpendicular to the feeding direction of the dough piece so as to bring a part of the lower part of the dough piece to the center of the dough piece.

2. A method of forming spherical dough bodies, comprising:

feeding dough pieces in a feeding direction;

applying pressure horizontally on both sides of each dough piece at the same time to squeeze the dough pieces;

rotating the dough pieces substantially around the vertical axes of the dough pieces; and repeatedly applying force to a lower part of the dough pieces in a direction that is substantially perpendicular to the feeding direction of the dough pieces so as to bring a part of the lower part of each dough piece to the center of the dough piece.

3. The method of forming a spherical dough body of claim 1, wherein a force is applied to the lower part of each dough piece by a member having a slanted surface so as to bring a part of the dough piece to the center of the dough piece.

4. The method of forming a spherical dough body claim 1, further comprising the step of repeatedly applying a pressure on a higher part of each dough piece from above the dough piece.

5. A method of forming spherical dough bodies, comprising:

cutting dough pieces from a sheet of dough being fed on a conveyor along a feeding direction and having a predetermined thickness so that the dough pieces are spaced apart from each other in a width direction and in a feeding direction;

feeding each dough piece along the feeding direction to one of a plurality of dough shaping members disposed above a support member;

applying pressure horizontally on both sides of each dough piece at the same time by means of the dough shaping members; and rotating the dough pieces substantially around the vertical axes of the dough pieces by means of the movement of the dough shaping members.

6. The method of forming a spherical dough body claim 5, further comprising the step of repeatedly applying a pressure on a higher part of each dough piece from above the bread dough piece.

7. The method of forming a spherical dough body of claim 5, further comprising the step of repeatedly applying a force to a lower part of the dough pieces in a direction that is substantially perpendicular to the feeding direction of the dough pieces so as to bring a part of the lower part of each dough piece to the center of the dough piece.

8. The method of forming a spherical dough body of claim 1, comprising providing dough shaping members for feeding the dough piece in the feeding direction and for applying a pressure horizontally to the dough piece to squeeze the dough.

9. The method of forming the spherical dough body of claim 8, wherein the dough shaping members comprise a first conveyor and a second conveyor.

10. The method of forming the spherical dough body of claim 9, further comprising the step of rotating the first conveyor at a speed that is greater than a speed of the second conveyor.

* * * * *